United States Patent
Cuzzolino et al.

(10) Patent No.: US 9,976,682 B2
(45) Date of Patent: May 22, 2018

(54) SWIVEL COUPLING

(71) Applicant: JMC Steel Group, Inc., Chicago, IL (US)

(72) Inventors: Marcello Cuzzolino, Schererville, IN (US); Richard Flading, Wheeling, WV (US); Jeff Kneubehl, Masury, OH (US); John Parks, Newcomerstown, OH (US); Jay Burris, Caldwell, OH (US); Edward Feeney, Sharon, PA (US)

(73) Assignee: ZEKELMAN INDUSTRIES, INC., Chicago, IL (US)

( * ) Notice: Subject to any disclaimer, the term of this patent is extended or adjusted under 35 U.S.C. 154(b) by 1152 days.

(21) Appl. No.: 14/141,090

(22) Filed: Dec. 26, 2013

(65) Prior Publication Data

US 2014/0175792 A1    Jun. 26, 2014

Related U.S. Application Data

(60) Provisional application No. 61/745,969, filed on Dec. 26, 2012.

(51) Int. Cl.
| | |
|---|---|
| *F16L 37/53* | (2006.01) |
| *F16L 37/084* | (2006.01) |
| *H02G 3/06* | (2006.01) |

(52) U.S. Cl.
CPC ............ *F16L 37/084* (2013.01); *F16L 37/53* (2013.01); *H02G 3/06* (2013.01)

(58) Field of Classification Search
CPC ........... F16L 37/084; F16L 37/53; H02G 3/06
See application file for complete search history.

(56) References Cited

U.S. PATENT DOCUMENTS

| | | | | |
|---|---|---|---|---|
| 1,729,483 A | * | 9/1929 | Koch ................. | F16L 15/006 |
| | | | | 131/225 |
| 1,822,887 A | * | 9/1931 | Hagstedt .............. | F16L 15/001 |
| | | | | 285/357 |

(Continued)

FOREIGN PATENT DOCUMENTS

| | | | | |
|---|---|---|---|---|
| CH | 639508 A5 | * | 11/1983 | ............. F16L 11/18 |
| DE | 10322878 A1 | * | 1/2005 | ......... B60H 1/00564 |
| WO | 2012/175817 A1 | | 12/2012 | |

OTHER PUBLICATIONS

International Search Report and Written Opinion dated Apr. 24, 2014, as received in International Application No. PCT/US2013/077797.

*Primary Examiner* — David Bochna
*Assistant Examiner* — James A Linford
(74) *Attorney, Agent, or Firm* — Baker & Hostetler LLP

(57) ABSTRACT

A coupling assembly includes a first member having a male mating portion and a first conduit receiving portion and a second member having a female mating portion and a second conduit receiving portion, wherein the male mating portion is engaged with the female mating portion to prevent disassociation of the first member and the second member while permitting free rotation of the first member and the second member with respect to each other. A method of coupling a first conduit and a second conduit includes providing a first coupling member having a first mating portion and a second coupling member having a second mating portion, and compression fitting the first mating portion with the second mating portion to prevent disassociation of the first member and the second member while permitting relative rotation of the first member and the second member with respect to each other.

8 Claims, 6 Drawing Sheets

(56) References Cited

U.S. PATENT DOCUMENTS

| | | | |
|---|---|---|---|
| 3,144,262 A | | 8/1964 | Reynolds |
| 4,030,850 A | * | 6/1977 | Hyde ..................... B65D 90/08 |
| | | | 220/795 |
| 4,592,574 A | | 6/1986 | Vollmuth et al. |
| 6,056,020 A | | 5/2000 | Malone |
| 2003/0034646 A1 | | 2/2003 | Baruh |
| 2005/0285397 A1 | | 12/2005 | Louden |
| 2007/0176424 A1 | * | 8/2007 | Nobileau ................ E21B 17/08 |
| | | | 285/382 |
| 2008/0191466 A1 | * | 8/2008 | Knipple ............ A61M 16/0816 |
| | | | 285/31 |

\* cited by examiner

Fig. 7

Proto 41 - Female

| Dwg Mark # | Description | | 2" Cplg. | 2-1/2" Cplg. | 3" Cplg. | 3-1/2" Cplg. | 4" Cplg. | 5" Cplg. | 6" Cplg. |
|---|---|---|---|---|---|---|---|---|---|
| | Selectable parameters | | | | | | | | |
| RC | Radial Clearance (B1-A2)/2 | 0.010 | 0.010 | 0.010 | 0.010 | 0.010 | 0.010 | 0.010 | 0.010 |
| AC | Axial Clearance-Female (C1-(D2+E2))/2 | 0.010 | 0.010 | 0.010 | 0.010 | 0.010 | 0.010 | 0.010 | 0.010 |
| | Target Minimum Joint Wall | 0.100 | 0.100 | 0.100 | 0.100 | 0.100 | 0.100 | 0.100 | 0.100 |
| | Lip Depth | 0.055 | 0.055 | 0.055 | 0.055 | 0.055 | 0.055 | 0.055 | 0.055 |
| | Fixed Design parameters | | | | | | | | |
| | Pipe OD | | 2.650 | 3.250 | 3.870 | 4.480 | 4.875 | 6.000 | 7.200 |
| | Wall Thickness | | 0.202 | 0.275 | 0.272 | 0.367 | 0.291 | 0.304 | 0.400 |
| | Pipe ID | | 2.246 | 2.700 | 3.326 | 3.746 | 4.293 | 5.392 | 6.400 |
| | Original full cplg length | | 2.063 | 3.188 | 3.313 | 3.406 | 3.516 | 3.953 | 4.250 |
| | Thread length | | 1.031 | 1.594 | 1.656 | 1.703 | 1.750 | 1.977 | 2.125 |
| | Thread end to joint face | | 0.078 | 0.078 | 0.078 | 0.078 | 0.078 | 0.078 | 0.078 |
| C1 | Groove Width | | 0.156 | 0.156 | 0.156 | 0.156 | 0.156 | 0.156 | 0.156 |
| D1 | Width of Lip land area | | 0.030 | 0.030 | 0.030 | 0.030 | 0.030 | 0.030 | 0.030 |
| F1 | Lead in chamfer angle (deg) | | 30.000 | 30.000 | 30.000 | 30.000 | 30.000 | 30.000 | 30.000 |
| | Calculated Parameters | | | | | | | | |
| A1 | Lip Land Dia. | | 2.403 | 2.920 | 3.546 | 3.966 | 4.513 | 5.612 | 6.620 |
| B1 | Groove depth Dia. | | 2.513 | 3.030 | 3.656 | 4.076 | 4.623 | 5.722 | 6.730 |
| E1 | Width of lead in chamfer | | 0.092 | 0.092 | 0.092 | 0.092 | 0.092 | 0.092 | 0.092 |
| G1 | Calculated lead in ID | | 2.509 | 3.026 | 3.652 | 4.072 | 4.619 | 5.718 | 6.726 |
| | Joint length | | 0.278 | 0.278 | 0.278 | 0.278 | 0.278 | 0.278 | 0.278 |
| | Swivel half OAL | | 1.387 | 1.950 | 2.012 | 2.059 | 2.106 | 2.333 | 2.481 |
| | Minimum joint wall | | 0.069 | 0.110 | 0.107 | 0.202 | 0.126 | 0.139 | 0.235 |
| | Lip land from inner wall | | 0.079 | 0.110 | 0.110 | 0.110 | 0.110 | 0.110 | 0.110 |
| | Grove depth from inner wall | | 0.134 | 0.165 | 0.165 | 0.165 | 0.165 | 0.165 | 0.165 |
| | Lip land from outer wall | | 0.124 | 0.165 | 0.162 | 0.257 | 0.181 | 0.194 | 0.290 |
| | Grove depth from outer wall | | 0.069 | 0.110 | 0.107 | 0.202 | 0.126 | 0.139 | 0.235 |

Proto 42 - Male

| Dwg Mark # | Description | 2" Cplg. | 2-1/2" Cplg. | 3" Cplg. | 3-1/2" Cplg. | 4" Cplg. | 5" Cplg. | 6" Cplg. |
|---|---|---|---|---|---|---|---|---|
| | Fixed Design parameters | | | | | | | |
| | Pipe OD | 2.650 | 3.250 | 3.870 | 4.480 | 4.875 | 6.000 | 7.200 |
| | Wall Thickness | 0.202 | 0.275 | 0.272 | 0.367 | 0.291 | 0.304 | 0.400 |
| | Pipe ID | 2.246 | 2.700 | 3.326 | 3.746 | 4.293 | 5.392 | 6.400 |
| | Original full cplg length | 2.063 | 3.188 | 3.313 | 3.406 | 3.516 | 3.953 | 4.250 |
| | Thread length | 1.031 | 1.594 | 1.656 | 1.703 | 1.750 | 1.977 | 2.125 |
| | Thread end to joint face | 0.100 | 0.100 | 0.100 | 0.100 | 0.100 | 0.100 | 0.100 |
| C2 | Groove Width | 0.142 | 0.142 | 0.142 | 0.142 | 0.142 | 0.142 | 0.142 |
| D2 | Width of Lip land area | 0.030 | 0.030 | 0.030 | 0.030 | 0.030 | 0.030 | 0.030 |
| F2 | Lead in chamfer angle (deg) | 30.000 | 30.000 | 30.000 | 30.000 | 30.000 | 30.000 | 30.000 |
| | Grove depth from inner wall | 0.069 | 0.100 | 0.100 | 0.100 | 0.100 | 0.100 | 0.100 |
| | Calculated Parameters | | | | | | | |
| A2 | Lip Land Dia. | 2.493 | 3.010 | 3.636 | 4.056 | 4.603 | 5.702 | 6.710 |
| B2 | Groove depth Dia. | 2.383 | 2.900 | 3.526 | 3.946 | 4.493 | 5.592 | 6.600 |
| E2 | Width of lead in chamfer | 0.106 | 0.106 | 0.106 | 0.106 | 0.106 | 0.106 | 0.106 |
| G2 | Calculated lead in OD | 2.371 | 2.888 | 3.514 | 3.934 | 4.481 | 5.580 | 6.588 |
| | Joint length | 0.278 | 0.278 | 0.278 | 0.278 | 0.278 | 0.278 | 0.278 |
| | Swivel half OAL | 1.409 | 1.972 | 2.034 | 2.081 | 2.128 | 2.355 | 2.503 |
| | Minimum Joint Wall | 0.069 | 0.100 | 0.100 | 0.100 | 0.100 | 0.100 | 0.100 |
| | Lip land from inner wall | 0.124 | 0.155 | 0.155 | 0.155 | 0.155 | 0.155 | 0.155 |
| | Assembled Coupling Parameters | | | | | | | |
| | Minimum Overall Assembled Swivel Joint Length | 2.519 | 3.644 | 3.769 | 3.862 | 3.956 | 4.409 | 4.706 |
| | Overlength compared to orig. full cplg. Length | 0.456 | 0.456 | 0.456 | 0.456 | 0.440 | 0.456 | 0.456 |
| | Lip engagement (A2-A1) | 0.045 | 0.045 | 0.045 | 0.045 | 0.045 | 0.045 | 0.045 |
| | Joint Thickness (B1-B2) | 0.065 | 0.065 | 0.065 | 0.065 | 0.065 | 0.065 | 0.065 |

SWIVEL COUPLING

CROSS-REFERENCE TO RELATED APPLICATIONS

This application is a non-provisional of U.S. patent application Ser. No. 61/745,969, filed on Dec. 26, 2012, the disclosure of which is incorporated herein by reference in its entirety.

FIELD OF THE INVENTION

The present invention relates to a coupling assembly and methods of use thereof for coupling adjoining sections of pipe or conduit and, more particularly, to a coupling assembly for quickly and efficiently coupling adjoining sections of pipe or conduit for carrying insulated electric cables.

BACKGROUND OF THE INVENTION

Metal pipes or conduits, such as, for example, Rigid Metal Conduit (RMC), Intermediate Metal Conduit (IMC), Electrical Metallic Tubing (EMT) and Rigid Aluminum Conduit (RAC), are often used to run electrical conductors over long distances, particular in corrosive or industrial atmospheres. The conduits may be buried underground or set in concrete, for example, to provide protected raceways for electrical wiring. Metal conduits for running electrical conductors are often preferred because of the protection they offer, acting as effective physical shields against a variety of environmental concerns such as water corrosion and electrical magnetic interference (EMI), while also providing the capability to serve as an effective grounding conductor.

Metal conduits are typically provided in five (5) to twenty (20) foot lengths, ten (10) foot lengths being generally preferred, and have inside diameters ranging from one half (½) inch to six (6) inches, although various other lengths and diameters may be used as well. The conduits may be formed to have bend contours for applications requiring just about any configuration of run. A primary issue for installers of these conduits is dealing with the weight of each separate conduit, a typical 10 foot conduit weighing upwards of 100 pounds. Often, when in the field, the handling required and brute force necessary to connect multiple lengths of conduit in co-axial or end-to-end relationships can be cumbersome and difficult.

Various couplings have been developed for use in joining adjacent conduits. For example, some conduits are formed with external threads at one end and a swaged section with internal threading at the other end. Joining adjacent conduits thus requires fitting the externally threaded end of a first conduit into the swaged section of a second conduit and turning either one or both of the conduits to form a structurally sound and electrically sound connection. In yet other applications, various compression couplings or other coupling assemblies have been developed. In some cases, each end of the conduit sections may be formed with external threads, and the coupling assembly may be internally threaded or use an internally threaded sleeve so that one end of each of the conduit sections may be threaded into the coupling to form a sound connection. However, particularly when one of the conduits has an elbow or other bends and/or the clearance in the area of the coupling is tight, for example, having to turn one or both of the conduits may be extremely difficult when trying to couple two adjacent conduits end-to-end.

There is a need and desire for a coupling assembly that can be easily and effectively used in the field to join two adjacent conduits end-to-end. The coupling provided must be structurally and electrically sound to guarantee the aforementioned benefits for using metal conduits when running electrical conductors.

SUMMARY OF THE INVENTION

Embodiments of the present invention advantageously provide a coupling assembly and methods of use thereof. In accordance with aspects of the present disclosure, a coupling assembly includes a first member having a male mating portion and a first conduit receiving portion and a second member having a female mating portion and a second conduit receiving portion, wherein the male mating portion is engaged with the female mating portion to prevent disassociation of the first member and the second member while permitting relative rotation of the first member and the second member with respect to each other.

In accordance with yet other aspects of the present disclosure, a method of coupling a first conduit and a second conduit includes providing a first coupling member having a first mating portion and a first conduit receiving portion, and a second coupling member having a second mating portion and a second conduit receiving portion; and compression fitting the first mating portion with the second mating portion to prevent disassociation of the first member and the second member while permitting relative rotation of the first member and the second member with respect to each other.

There has thus been outlined, rather broadly, certain embodiments of the invention in order that the detailed description thereof may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and constitute a part of this specification, illustrate various embodiments consistent with the invention, and, together with the description, serve to explain the principles of the invention.

FIG. 7 is a chart illustrating values of various parameters of exemplary coupling assemblies for different size couplings, in accordance with certain aspects of the present invention.

DETAILED DESCRIPTION

Figure 1:
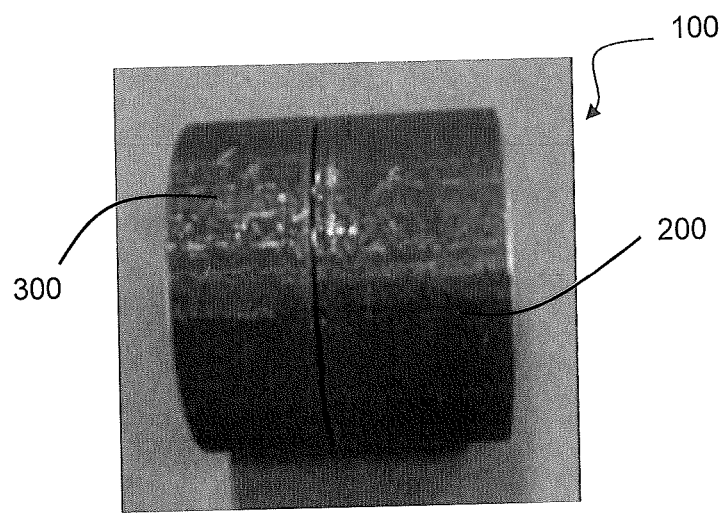
FIG. 1 is a front view of an exemplary coupling assembly, in accordance with certain aspects of the present invention.

The invention will now be described with reference to the drawing figures, in which like reference numerals refer to like parts throughout.

Various aspects of a coupling assembly may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present.

Relative terms such as "lower" or "bottom" and "upper" or "top" may be used herein to describe one element's relationship to another element illustrated in the drawings. It will be understood that relative terms are intended to encompass different orientations of a coupling assembly in addition to the orientation depicted in the drawings. By way of example, if aspects of a coupling assembly shown in the drawings are turned over, elements described as being on the "bottom" side of the other elements would then be oriented on the "top" side of the other elements. The term "bottom" can therefore encompass both an orientation of "bottom" and "top" depending on the particular orientation of the apparatus.

Various aspects of a coupling assembly may be illustrated with reference to one or more exemplary embodiments. As used herein, the term "exemplary" means "serving as an example, instance, or illustration," and should not necessarily be construed as preferred or advantageous over other embodiments of a coupling assembly disclosed herein.

FIG. 1 illustrates a coupling assembly 100 in accordance with aspects of the present disclosure. As shown, the coupling assembly 100 includes a first member 200 and a second member 300. The first member 200 and the second member 300 are cylindrical and configured to align axially along a common axis, each respective member having a cylinder wall with substantially the same inner diameter and the same outer diameter as the other member. The first member 200 and the second member 300 are separately formed parts configured to axially engage one another in a manner that prevents disassociation during use while permitting the members 200 and 300 to rotate freely with respect to one another, at least until the coupling assembly 100 is fully installed between adjacent conduit sections.

Figure 2:
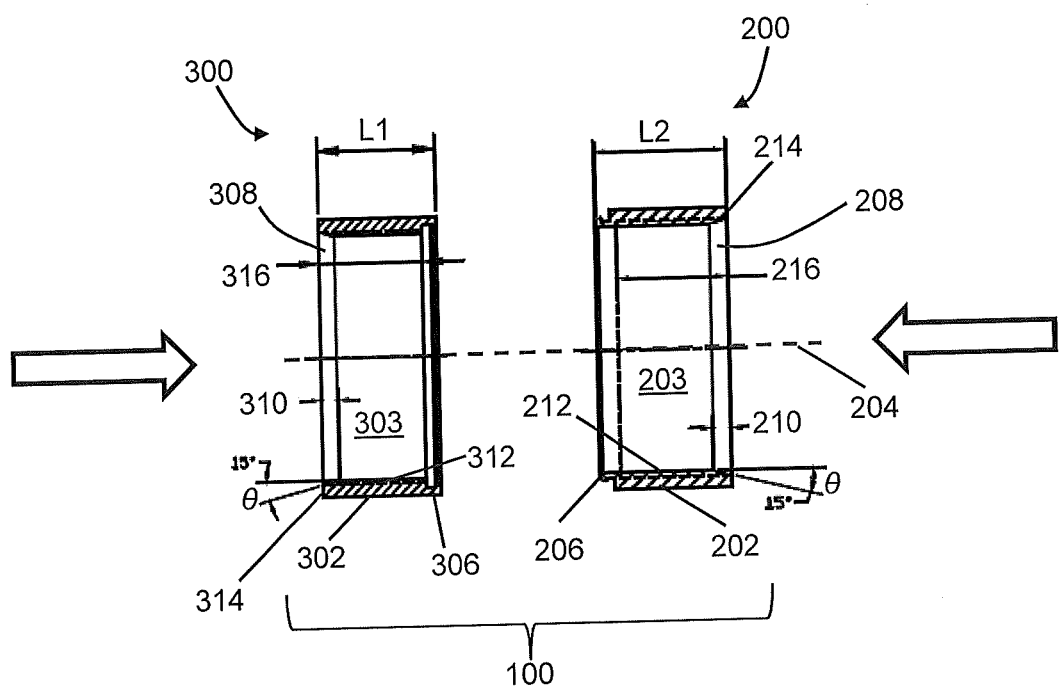
FIG. 2 is a sectional view of the first and second members of a coupling assembly, in accordance with certain aspects of the present invention.

As shown in the cross-section view of FIG. 2, the first member 200 includes a first cylindrical wall 202 forming a first bore 203 extending a predetermined axial length L2 along a central axis 204. The first cylindrical wall 202 may be configured with a male mating portion 206 at one end and a first conduit receiving portion 208 at the other end. The first conduit receiving portion 208 may include an internal chamfer 210 of predetermined axial length that extends from a first inner surface 212 toward a distal end surface 214 of the first cylinder wall 202 at a predetermined angle θ, which may be 15°, for example. The internal chamfer 210 allows the first conduit receiving portion 208 to more easily accept and guide a first conduit into engagement with the coupling assembly 100. The first inner surface 212 may have a predetermined length of internal threading 216 extending into the bore 203.

The second member 300 includes a second cylindrical wall 302 forming a second bore 303 extending a predetermined axial length L1 along the central axis 204. The second cylindrical wall 302 may be configured with a female mating portion 306 at one end and a second conduit receiving portion 308 at the other end. The second conduit receiving portion 308 may include an internal chamfer 310 of predetermined axial length that extends from a second inner surface 312 toward a distal end surface 314 of the second cylindrical wall 302 at a predetermined angle θ, which may be 15°, for example. The internal chamfer 310 allows the second conduit receiving portion 308 to more easily accept and guide a second conduit into engagement with the coupling assembly 100. The second inner surface 312 may have internal threading 316 extending the entire length through the second bore 303.

As shown in FIG. 2, to assemble the coupling assembly 100 shown in FIG. 1, the first member 200 and the second member 300 may be aligned axially along the axis 204. A compression force may be applied to drive the aligned members together so that the male mating portion 206 of the first member 200 and the female mating portion 306 of the second member 300 engage. The engagement of the mating portions 206 and 306 axially secures the first member 200 to the second member 300. As explained in further detail below, aspects of the mating portions 206 and 306 prevent disassociation of the first and second members 200 and 300 once engaged while also allowing the first and second members 200 and 300 to have relative rotation with respect to one another.

In accordance with aspects of the present disclosure, the coupling assembly 100 may be provided to an end user in the assembled state shown in FIG. 1. In particular, depending on the size, thickness and/or material of the individual members 200 and 300, extremely large compressive forces may be required for engagement, in which case preassembly at a manufacturing facility may be desirable. However, in accordance with yet other aspects of the present disclosure, the individual components of the assembly 100, namely the first and second members 200 and 300, may be separately provided and assembled as necessary in the field, for example.

Figure 3:
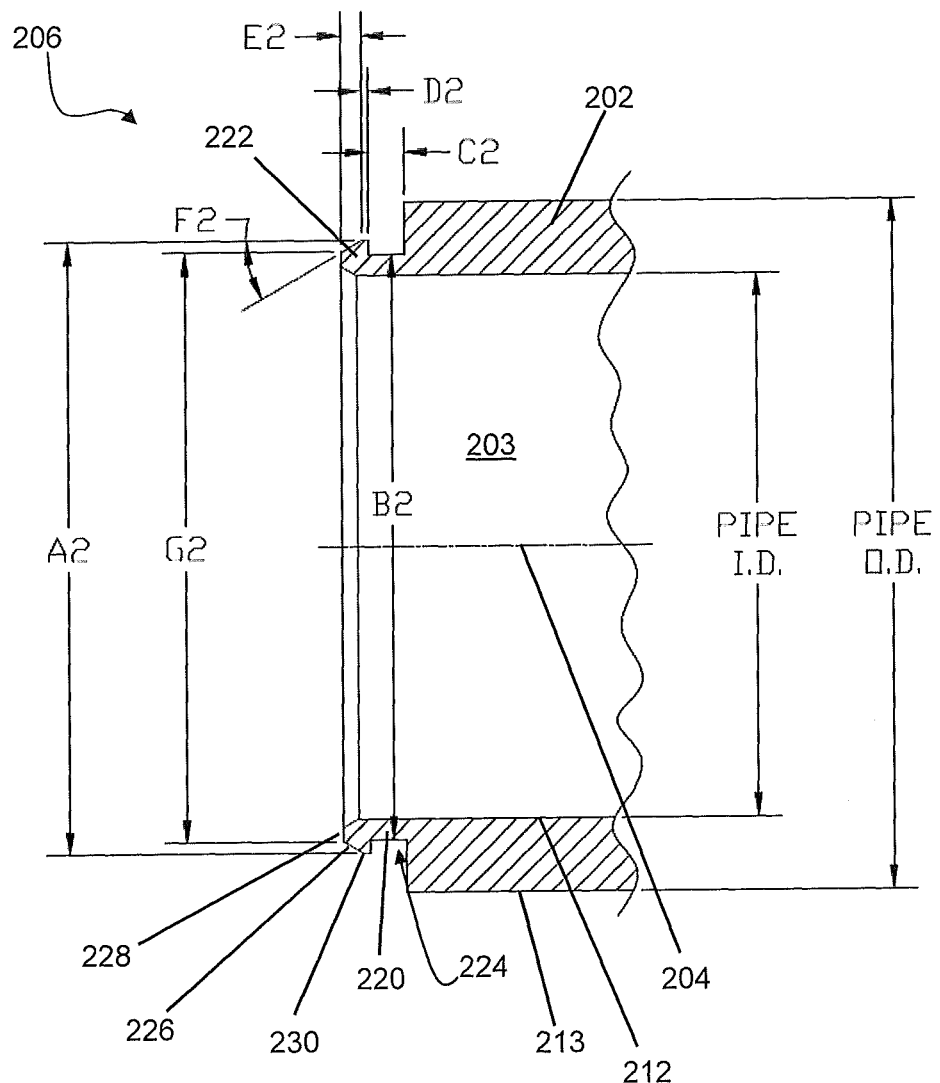
FIG. 3 is an enlarged sectional view of a first member of a coupling assembly, in accordance with certain aspects of the present invention.

FIG. 3 illustrates a close-up view of the male mating portion 206 of the first member 200. The male mating portion may be machined on the outside diameter of the coupling. The male mating portion 206 may consist of an annular hub 220 extending from the cylinder wall 202 to support an outwardly extending flanged lip 222 and define an annular groove 224. The first cylinder wall 202 has the first inner surface 212 defining an inside diameter of the cylinder wall 202 and a first outer surface 213 defining an outside diameter of the cylinder wall 202. The annular hub 220 shares the same inside diameter as the cylinder wall 202 and has an outer groove diameter B2. The flanged lip 222 defines a lead in chamfer 226 that extends at an angle F2 from an end surface 228 having an outer diameter G2 to a lip land area 230 having a lip land area diameter A2. The lead in chamfer 226 may have a width E2 and the angle F2 may be any suitable angle, such as 30°, to ensure proper engagement with the female portion 306. The lip land area 230 is a small annular surface having a width D2 that is substantially parallel to the inner surface 212 and the outer surface 213 of the first cylinder wall 202. The groove 224 defined by the hub 220 and the flanged lip 222 may have a predetermined groove width of C2.

Figure 4:
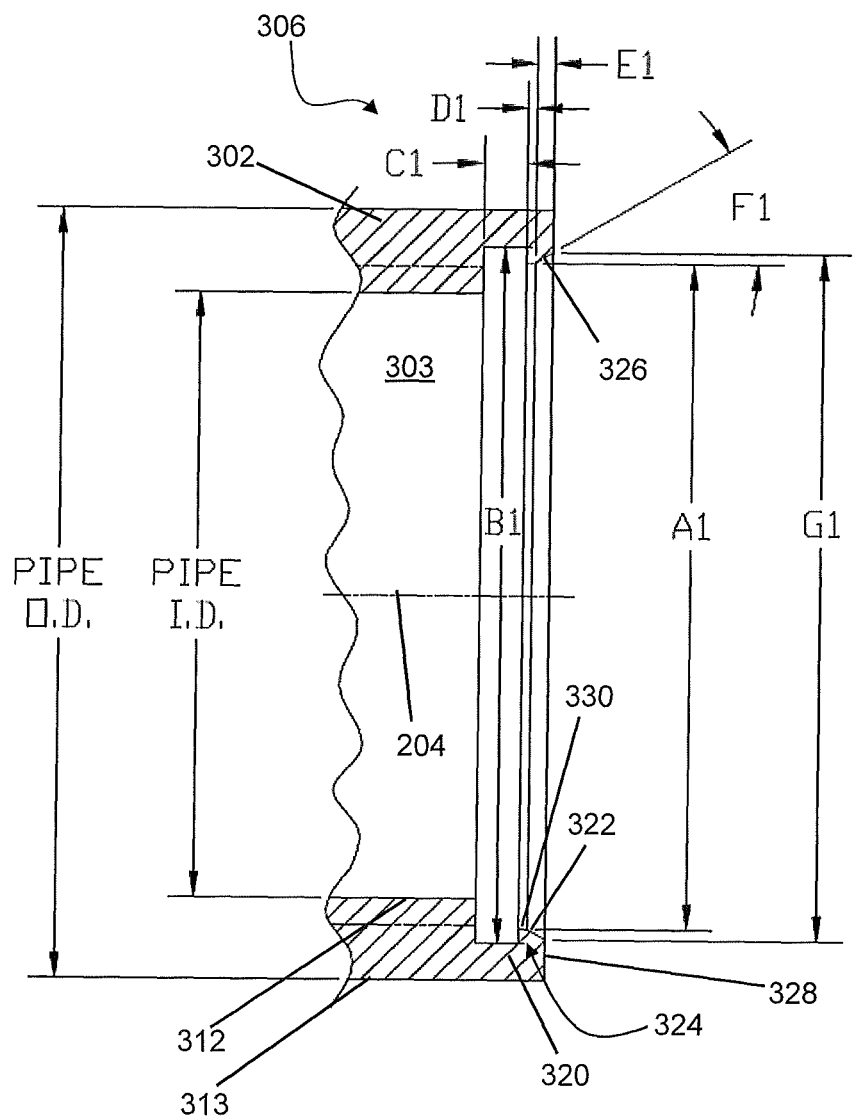
FIG. 4 is an enlarged sectional view of a second member of a coupling assembly, in accordance with certain aspects of the present invention.

FIG. 4 illustrates a close-up view of the female mating portion 306 of the first member 200. The female mating portion 306 may be machined on the inside diameter of the coupling. The female mating portion 306 may consist of a second annular hub 320 extending from the second cylindrical wall 302 to support an inwardly extending flanged lip 322 and define a second annular groove 324. The second cylindrical wall 302 has a second inner surface 312 defining an inside diameter of the cylinder wall 302 and a second outer surface 313 defining an outside diameter of the cylinder wall 302. The second annular hub 320 shares the same outside diameter as the cylinder wall 302 and has an inner groove diameter B1. The flanged lip 322 defines a lead in chamfer 326 that extends at an angle F1 from an end surface 328 having an inner diameter G1 to a lip land area 230 having a lip land area diameter A1. The lead in chamfer 326 may have a width E1 and the angle F1 may be any suitable angle, such as 30°, to ensure appropriate sliding engagement with the male portion 206. The lip land area 330 is a small annular surface having a width D1 that is substantially parallel to the inner surface 312 and the outer surface 313 of the second cylindrical wall 302. The inner groove 324 defined by the second annular hub 320 and the flanged lip 322 may have a predetermined groove width of C1.

Figure 5:
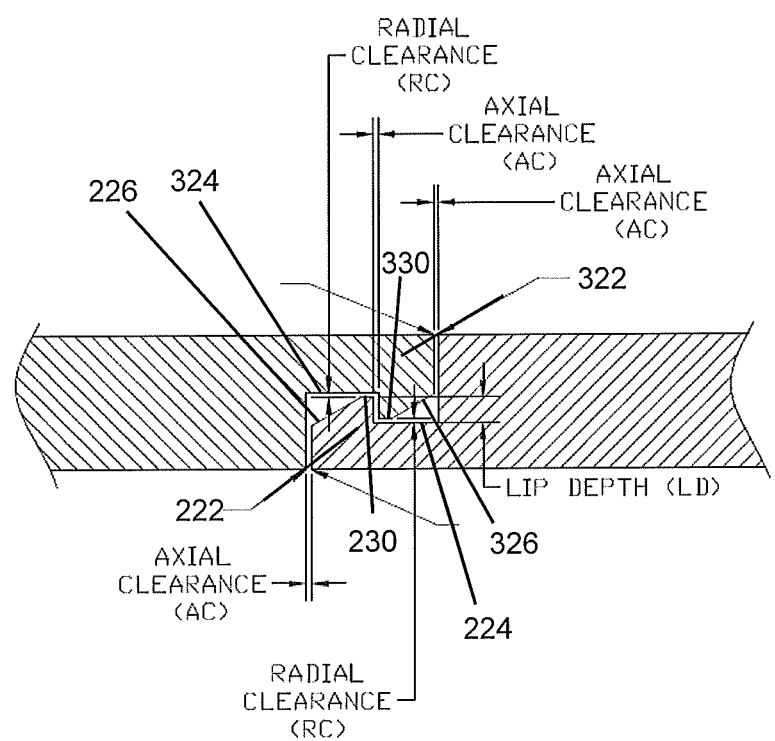
FIG. 5 is an enlarged sectional view illustrating a coupling joint, in accordance with certain aspects of the present invention.

FIG. 5 illustrates a close-up view of the coupled joint formed when the first member 200 and the second member 300 are compression fit together. During the compression fitting of the members 200 and 300, the lead in chamfer 226 of the male mating portion 206 and the lead in chamfer 326 of the female mating portion 306 slide past one another in frictional engagement. Displacement of the flanged lip 222 inward and/or displacement of the flanged lip 322 outward may occur until the respective lip land areas 230 and 330 are passed and each of the flanged lips 222 and 322 snap into the respective annular grooves 224 and 324. The radial clearance RC and axial clearance AC of the mated member 200 and 300 may be established in accordance with the lip depth LD, for example, to ensure that sufficient rotational capability is provided between the coupled members without significant loss in electrical conductivity, for example.

Figure 6:
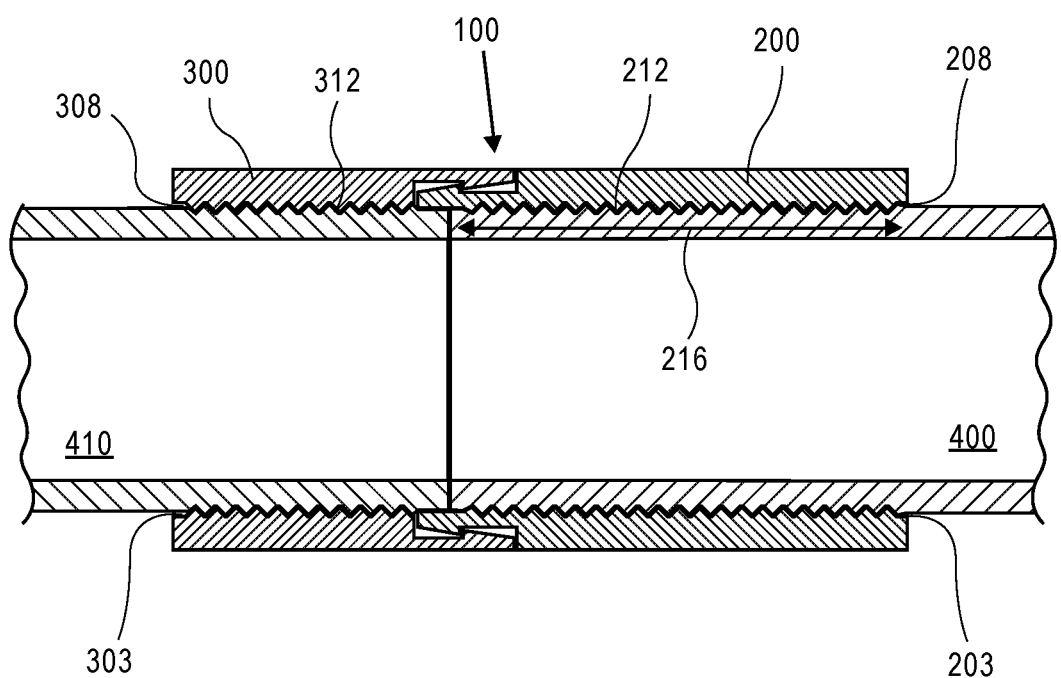
FIG. 6 is a sectional view illustrating a coupling assembly in a particular state of use, in accordance with certain aspects of the present invention.

The coupling assembly 100 may be used to connect two or more lengths of conduit. For example, conventional conduits for use with the coupling assembly 100 have external threading provided at least on an outer periphery of one end and preferably at both ends of the conduit. In this manner, as shown in FIG. 6, a typical first conduit 400 may be engaged into the bore 203 of the first member 200 through the first conduit receiving portion 208 and mated to the coupling assembly 100 by rotation of the first member 200 to engage the internal threading on the inner surface 212 with the external threading on the end of the first conduit 400. A tightening mechanism, such as a lock wrench or any other suitable tool, may be used to tighten the first member 200 onto the first conduit 400 until the first conduit extends to the limit of the predetermined length of internal threading 216. In accordance with other aspects of the present disclosure, the outer surface 213 of the first member may be formed with a friction surface to assist in the tightening process. For example, a patterned knurling may be configured onto the external surface for additional grip.

A second conduit 410 may then be engaged into the bore 303 of the second member 300 through the second conduit receiving portion 308 and mated to the coupling assembly 100 by rotation of the second member 300 to engage the internal inner surface 312 with the external threading on the second conduit 410. The coupling 100 may be tightened by continued threading of the second conduit 410 into the joint through rotation of the second member 300. The coupling 100 may thus be adjusted onto the conduits 400 and 410 until there is a minimal space between the conduits to ensure any electrical wires, for example, are clear of catching and may be protected from the elements. Although referenced in a particular sequence, the coupling 100 permits engagement of either member 200 or 300 with either conduit 400 or 410 in any sequence and/or concurrently.

In accordance with aspects of the present disclosure, as shown in FIG. 6, the second member 300 may be shortened and provided with internal threading through the entire bore 303. The second conduit 410 may be threaded into the coupling 100 to protrude a short distance into the assembled joint, i.e., into a portion of the bore 203. Thus, with the first conduit 400 threaded to its fullest extent into the bore 203, the joint may be configured to allow a certain amount of interference between the second conduit 410 and the first conduit 400. Due to this predetermined amount of interference, the swivel joint normally provided by the coupling assembly 100 may essentially become locked by way of the second conduit 410 pushing against the first conduit 400 and eliminating the axial clearance provided for rotational freedom of the joint. The friction established between the members 200 and 300 caused by loss of the axial clearance prevents rotation and axial movement of the coupling 100.

FIG. 7 is a chart to illustrate values of the various parameters of exemplary coupling assemblies in accordance with different size couplings ranging from 2 inch to 6 inch couplings. The advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A coupling assembly comprising:
   a first member having a first mating portion and a first conduit receiving portion;
   a second member having a second mating portion and a second conduit receiving portion, wherein the first member has a male mating portion which is an outwardly extending flanged lip in the form of an annular snap hook engaged with a female mating portion of the second member, the female mating portion has an inwardly extending flanged lip in the form of an annular snap hook to prevent disassociation of the first member and the second member while permitting relative rotation of the first member and the second member with respect to each other;

wherein the first member further comprises a first cylindrical wall having a first inside diameter and a first outside diameter and forming a first bore extending a predetermined axial length along a central axis, the first mating portion being machined on the outside diameter of the first cylindrical wall;

wherein the second member further comprises a second cylindrical wall having a second inside diameter and a second outside diameter and forming a second bore extending a second predetermined axial length along the central axis, the second mating portion being machined on the inside diameter of the second cylindrical wall;

a first conduit having at least one externally threaded end, and wherein the first bore is internally threaded for mating with the externally threaded end of the first conduit received through the first conduit receiving portion;

a second conduit having at least one externally threaded end, wherein the second bore is internally threaded for mating with the externally threaded end of the second conduit received through the first conduit receiving portion; and wherein the internal threading of the second bore and the internal threading of the first bore are configured to allow the second conduit to extend into the first bore to engage and apply force against the first conduit in order to eliminate any axial clearance between the first member and the second member.

2. The coupling assembly according to claim 1, wherein the first mating portion includes an annular hub extending from a distal end of the first cylindrical wall, the annular hub supporting the outwardly extending flanged lip and defining a first annular groove.

3. The coupling assembly according to claim 2, wherein the second mating portion includes a second annular hub extending from a distal end of the second cylindrical wall, the second annular hub supporting the inwardly extending flanged lip and defining a second annular groove.

4. The coupling assembly according to claim 3, wherein the annular hub shares the same first inside diameter of the first member and has an outer groove diameter greater than the first inside diameter and less than the first outside diameter of the first member.

5. The coupling assembly according to claim 4, wherein the second annular hub shares the same second outside diameter of the second member and has an inner groove diameter that is greater than the second inside diameter and less than the second outside diameter of the second member.

6. The coupling assembly according to claim 5, wherein the outwardly extending flanged lip defines an end surface having an end surface outer diameter and a lip land area having an annular surface of predetermined width and a lip land area diameter, and wherein a lead in chamfer extends at a predetermined angle from the outer diameter of the end surface to the lip land area.

7. The coupling assembly according to claim 6, wherein the inwardly extending flanged lip defines a second end surface having an end surface inner diameter and a second lip land area having an second annular surface of predetermined width and a second lip land area diameter, and wherein a second lead in chamfer extends at a second predetermined angle from the inner diameter of the second end surface to the second lip land area.

8. The coupling assembly according to claim 7, wherein an axial clearance is defined between the end surface of the outwardly extending flanged lip and the second member, between the second end surface of the inwardly extending flanged lip and the first member, and between the inwardly extending and outwardly extending flanged lips, and wherein a radial clearance is defined between the first lip land area and the second annular groove and between the second lip land area and the first annular groove, the axial clearance and the radial clearance being controlled by a lip depth of the inwardly extending flanged lip and the outwardly extending flanged lip and an annular groove width of the first annular groove and the second annular groove to facilitate rotation of the engaged first member and the second member while maintaining electrical connectivity between the first member and the second member.

* * * * *